March 5, 1940.　　J. F. O'MALLEY　　2,192,774
AIRPLANE
Filed Dec. 8, 1938　　2 Sheets-Sheet 1
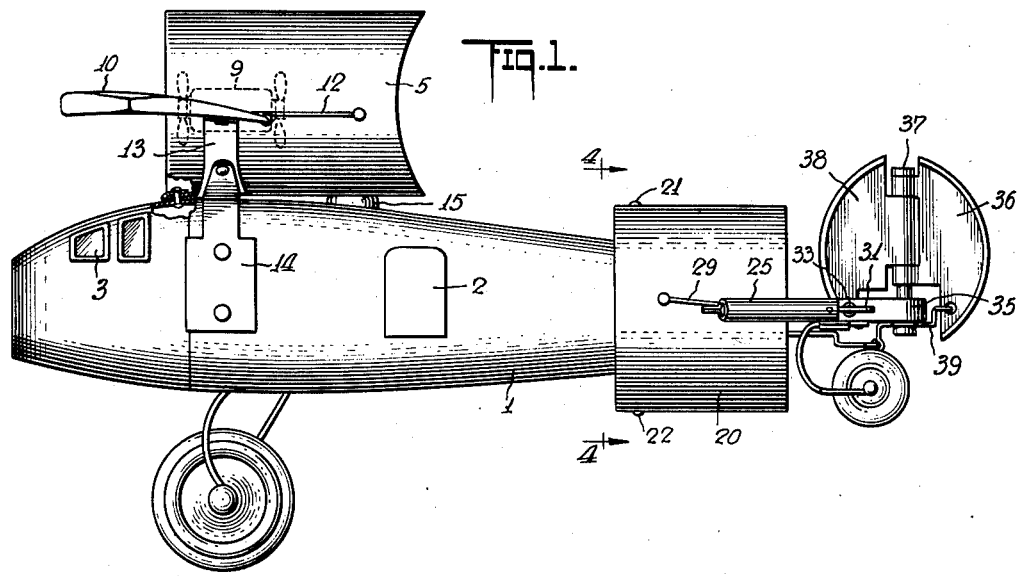
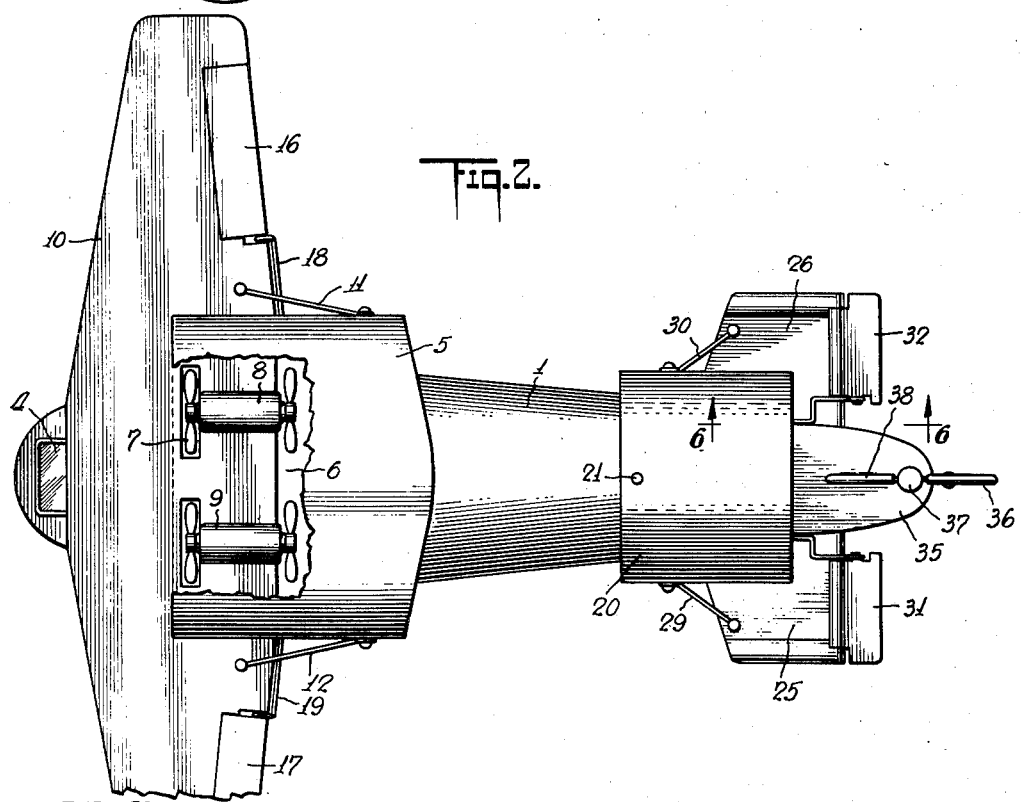
WITNESSES
Frank L. Faggiani
A. L. Kitchin
INVENTOR
John F. O'Malley
BY
Munn Anderson & Liddy
ATTORNEYS March 5, 1940.　　　J. F. O'MALLEY　　　2,192,774
AIRPLANE
Filed Dec. 8, 1938　　　2 Sheets-Sheet 2
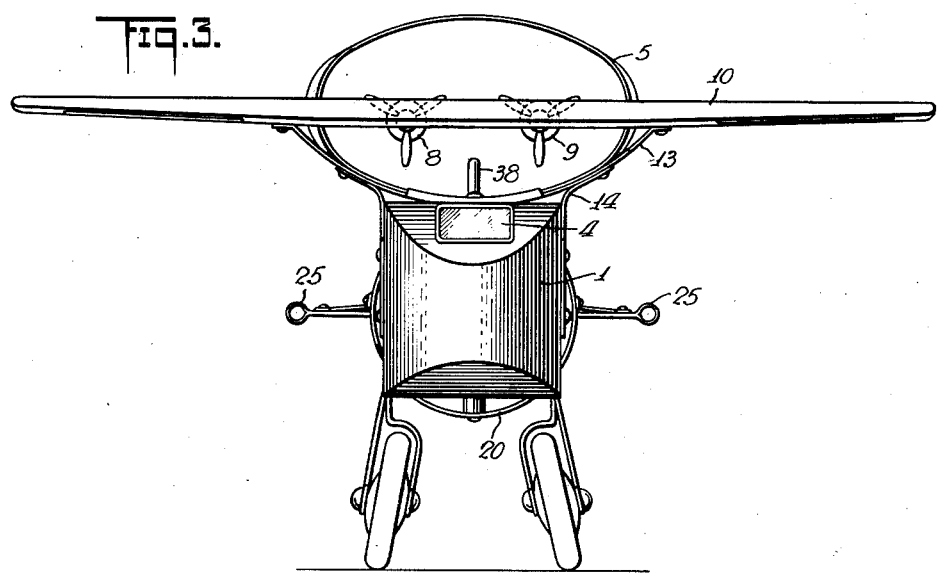
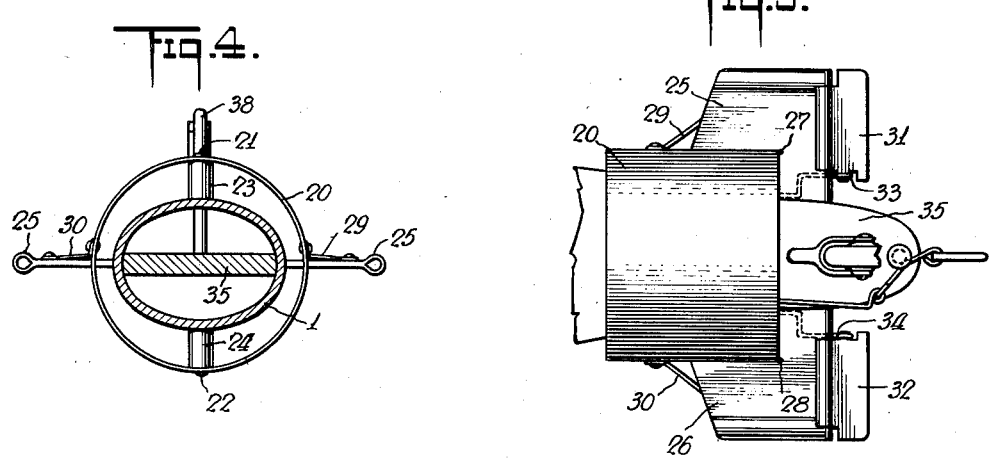
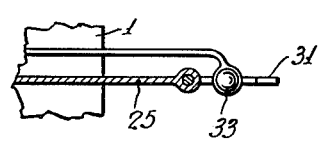
WITNESSES
Frank L. Saggiani
A. L. Kitchin
INVENTOR
John F. O'Malley
BY
Munn Anderson & Liddy
ATTORNEYS Patented Mar. 5, 1940

2,192,774

UNITED STATES PATENT OFFICE 2,192,774

AIRPLANE

John Francis O'Malley, Flushing, N. Y.

Application December 8, 1938, Serial No. 244,557

4 Claims. (Cl. 244—15)

This invention relates to aircraft and particularly to an improved airplane, an object being to provide a construction which will be substantially silent while in flight while presenting a construction which secures high speed with safety.

Another object of the invention is to provide an improved airplane formed with a special tubular structure which will permit the engines to be arranged centrally of the wing for the purpose of increasing the speed of the airplane.

A further object of the invention is to provide an improved airplane having tubular chambers at the rear of the fuselage and at the center of the rear half of the wing structure, the tubular chambers at the center of the wing presenting a housing for the engines and propellers while the rear chambers present a steadying and lifting structure.

In the accompanying drawings—

Fig. 1 is a side view of an airplane disclosing an embodiment of the invention;

Fig. 2 is a top plan view of the airplane shown in Fig. 1, certain parts being broken away for better illustrating certain structures;

Fig. 3 is a front view of the structure shown in Fig. 1;

Fig. 4 is a transverse sectional view through Fig. 1, approximately on the line 4—4;

Fig. 5 is a bottom plan view of the construction shown at the rear of Fig. 1; and Fig. 6 is a fragmentary sectional view through Fig. 2, approximately on the line 6—6.

Referring to the accompanying drawings by numerals, 1 indicates a fuselage which may be constructed in various ways in detail. In the accompanying drawings, the details of the airplane which are old and well known have been omitted for the purpose of clearness and only the parts presenting the invention shown fully. As just mentioned, the fuselage 1 may be formed in any suitable way and provided with a side door 2 and side windows 3. A front or top member 4 is also provided as it is intended that the aviator shall be near the front of the airplane and in a position to use the windows 3 and 4. It will be understood that windows 3 are arranged on each side of the fuselage so that the aviator may readily see on both sides and in front as the airplane moves through the air. A propeller housing 5 is carried by the fuselage. This housing is preferably elliptical when viewed from the front with the sides extending straight toward the rear so that air entering may freely escape without creating pressure on the housing. The housing, in effect, forms what may be termed a chamber 6, into which the respective propellers 7 are arranged and in which the respective engines 8 and 9 are positioned. It will be seen that the housing 5 telescopes over the rear half of the wing structure 10 and that the engines 8 and 9 are carried in this wing structure with the propellers wholly within the housing 5.

Preferably the parts are so arranged that the propellers will extend an equal distance above and below the wing structure. It will be observed that the propellers and their engines are arranged centrally of the wing structure and above the central front portion of the fuselage. This centers the power so that the forward urge is produced from substantially centrally of the wing structure at the rear portion thereof. Also, it will be observed that the propellers are all housed in the chamber 6 so as to draw in air from the front and force it to the rear. This arrangement reduces noise to a minimum, whereby the airplane will be substantially silent as it moves through the air.

The housing 5 may be made from sheet metal, or other suitable material, and braced by side braces 11 and 12 to prevent any lateral movement while at the bottom, near the front, there is provided an arc-shaped supporting brace 13 secured by rivets or bolts to the wing structure 10 and also to the fuselage 1. In addition, substantially L-shaped braces 14 are provided, there being one brace on each side of the fuselage. These braces are riveted or otherwise rigidly secured to the brace 13, as illustrated in Figs. 1 and 3. If desired, the bottom of the housing 5 may be provided with a door in alignment with a door in the top of the fuselage so that an aviator, mechanic, or other person, may pass from the interior of the fuselage upwardly into the housing 5 during a flight if it should be desired to inspect either of the engines or any of the propellers. The rear of the housing 5 is connected by a suitable brace 15 to the top of the fuselage. By reason of this connection and the other braces the housing is firmly held in place and provides, in a certain sense, a funnel through which all of the air that is engaged by the respective propellers passes.

The ailerons 16 and 17 may be of any desired type and operated by any suitable or conveniently actuated mechanism 18 and 19. At the rear of the fuselage 1 there is provided a circular housing 20, which is bolted or otherwise rigidly secured to the housing by top and bottom bolts or screws 21 and 22. Tubular spacing members 23 and 24 are used to space and hold the housing in proper position when the bolts are tightened. Webs 25 and 26 are bolted, riveted, or otherwise rigidly secured to the rear part of the fuselage 1, and the rear part of the housing 20 extends into slits 27 and 28 in these webs, whereby the rear part of the housing is braced against lateral movement. In addition, diagonal braces 29 and 30 are connected to the housing 20 and also to the webs 25 and 26. These webs carry the elevators 31 and 32, which are operated by suitable mechanism 33 and 34 of any preferred or standard construction. It will be understood that all these control members extend to the front of the fuselage to be operated by the aviator from time to time as necessary.

The webs 25 and 26 merge into a central web 35 on which a rudder 36 is mounted. A pin 37 is carried by the web 35, which pin is supported by this web and by a fin 38 which is secured at its front end to the web 35. The rudder 36 is freely swingable in a horizontal plane and is operated by a suitable pull-and-push mechanism 39 of any standard or preferred form. This mechanism extends to the aviator at the front so that the rudder may be actuated as desired The detail features of the rudder and elevators may be varied widely without departing from the spirit of the invention. However, the housing 20 is important and embodies several features of the present invention. Housing 5 also forms certain features of the invention. The housing 20 acts as a lifting and stabilizing force at the tail or rear of the fuselage when the airplane is passing through the air. Incidentally, it will be observed that by reason of the use of the housing 5, there will be a stabilizing action also at the front, as well as means for enclosing the propellers and motors. Suitable wheels have been shown as forming the landing gear but this structure may be varied widely as the same forms no part of the present invention.

The type of airplane shown is one where the wing is above the fuselage. It will be evident, however, that the invention could be applied to those airplanes where the wing is at the bottom or below the fuselage.

I claim:

1. An airplane of the character described including a fuselage, an elliptical housing secured to the top of the fuselage near the front end thereof, said housing extending in a straight line fore and aft, a wing extending centrally through the front half of said housing, that part of said wing extending through said housing having propeller-receiving openings; an engine arranged in said housing at the rear of said wing, a propeller operated by said engine, said propeller being mounted so that the blades thereof will move through said openings and means for steering the airplane.

2. An airplane including a fuselage and a wing connected with the fuselage, steering means, a pair of motors mounted on the wing near the center at the rear part thereof, a propeller connected to and adapted to be actuated by each of said motors, and a housing surrounding said motors, propellers and part of said wing, said housing extending from substantially the longitudinal center of the airplane wing rearwardly beyond the wing, said housing enclosing on all sides except the front and back said engines and propellers.

3. An airplane including a fuselage, a wing connected with the fuselage and extending across the same at a point thereabove, a steering mechanism, a plurality of engines carried by said wing near the center thereof, said engines being arranged at the rear portion of said wing above the fuselage, a propeller connected to each of said engines at each end thereof, said wing being provided with openings for accommodating certain of said propellers while the other propellers are arranged rearwardly of the wing, and a substantially elliptical housing surrounding all of said propellers and engines except the front and back, said housing having its walls extending substantially parallel to the longitudinal center of said fuselage, whereby the air acted upon by said propellers will be within said housing during the contact of the propellers therewith.

4. In an airplane of the character described, a fuselage, a wing connected to the fuselage near the front thereof, means for propelling the airplane through the air, control means for the airplane, a tubular member surrounding the tail portion of the fuselage immediately in front of the rudder for acting as a lifting and stabilizing structure, and a tubular member telescoping over part of the center of said wing for stabilizing the airplane and reducing the noise of the propelling means.

JOHN FRANCIS O'MALLEY.